United States Patent
Al-Khowaiter et al.

(10) Patent No.: US 12,116,277 B2
(45) Date of Patent: Oct. 15, 2024

(54) COMBINED HYDROGEN AND ELECTRICITY PRODUCTION FROM AQUEOUS AMMONIA FEED

(71) Applicant: Saudi Arabian Oil Company, Dhahran (SA)

(72) Inventors: Ahmad O. Al-Khowaiter, Dhahran (SA); Aqil Jamal, Dhahran (SA); Kunho Lee, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 18/487,656

(22) Filed: Oct. 16, 2023

(65) Prior Publication Data

US 2024/0043269 A1   Feb. 8, 2024

Related U.S. Application Data (62) Division of application No. 17/938,223, filed on Oct. 5, 2022, now Pat. No. 11,820,657.

(60) Provisional application No. 63/252,780, filed on Oct. 6, 2021.

(51) Int. Cl.
  *B01J 19/24* (2006.01)
  *C01B 3/04* (2006.01)

(52) U.S. Cl.
  CPC ...... *C01B 3/047* (2013.01); *C01B 2203/0277* (2013.01); *C01B 2203/0405* (2013.01)

(58) Field of Classification Search
  CPC ............ C01B 3/047; C01B 2203/0277; C01B 2203/0405; C01B 3/501; F02C 3/22; F02C 6/18; F02C 7/08; F05D 2250/80; Y02E 60/36; B01J 19/2475

USPC ...................................................... 423/658.2
See application file for complete search history.

(56) References Cited

U.S. PATENT DOCUMENTS

| | | |
|---|---|---|
| 9,624,913 B2 | 4/2017 | Friesth |
| 2001/0006615 A1 | 7/2001 | Badano |
| 2012/0100062 A1 | 4/2012 | Nakamura et al. |
| 2020/0032676 A1 | 1/2020 | Nose et al. |
| 2020/0172394 A1 | 6/2020 | Han et al. |

FOREIGN PATENT DOCUMENTS

| | | |
|---|---|---|
| CN | 111957270 | 11/2020 |
| EP | 1683216 | 7/2006 |
| EP | 3995444 | 5/2022 |
| GB | 2449917 | 12/2008 |
| JP | 2004195454 | 7/2004 |
| JP | 2013095618 | 5/2013 |

(Continued)

OTHER PUBLICATIONS

"Ammonia to Green Hydrogen Project," Ecuity, STFC, Engie and Siemens, 2020, 70 pages.

(Continued)

*Primary Examiner* — Huy Tram Nguyen
(74) *Attorney, Agent, or Firm* — Fish & Richardson P.C.

(57) ABSTRACT

A system and a method for producing hydrogen and electrical power from an aqueous ammonia solution are provided. An exemplary system includes a distillation unit to produce ammonia gas from the aqueous ammonia solution, a compression unit to boost the pressure of the ammonia gas, a membrane separator to catalytically convert the ammonia gas to nitrogen and hydrogen and remove the hydrogen as a permeate, and a micro turbine to combust a retentate to generate energy.

10 Claims, 4 Drawing Sheets

(56) References Cited

FOREIGN PATENT DOCUMENTS

| KR | 101531291 | 7/2015 |
|---|---|---|
| KR | 101828938 | 2/2018 |
| KR | 1020210119823 | 10/2021 |
| WO | WO 2020118420 | 6/2020 |
| WO | WO 2020189566 | 9/2020 |

OTHER PUBLICATIONS

Berenschot, "Oxygen synergy for hydrogen production" TESN118016—Waterstofversneller, Dec. 2019, 97 pages.

Cechetto et al., "H2 production via ammonia decomposition in a catalytic membrane reactor," Fuel Processing Technology, 2021, 216, 106772, 9 pages.

Cerrillo et al., "High purity, self-sustained, pressurized hydrogen production from ammonia in a catalytic membrane reactor," Chemical Engineering Journal, 2022, 431, 134310, 13 pages.

Esposito, "Membraneless electrolyzers for low-cost hydrogen production in a renewable energy future" Joule 1.4, Dec. 2017, 651-658, 8 pages.

fusione.enea.it [online], "ENEA-Fusion: Fusion Technologies: Membrane Laboratory," available on or before Oct. 3, 2012 via Internet Archive: Wayback Machine URL <http://web.archive.org/web/20101003172212/http://www.fusione.enea.it/LABORATORIES/Tec/membrane.html.en>, retrieved on Jan. 11, 2023 from URL <http://www.fusione.enea.it/LABORATORIES/Tec/membrane.html.en>, 2 pages.

Garcia-Garcia et al., "High purity hydrogen production by low temperature catalytic ammonia decomposition in a multifunctional membrane reactor," Catalysis Communications, 2008, 9(3), 482, 5 pages.

gasworld.com [online], Anthony Leo, "Tri-Generation Fuel Cells, opening doors to distributed hydrogen markets," CryoGas International, Jul. 2016, Introduction, retrieved from URL <https://www.gasworld.com/story/tri-generation-fuel-cells-opening-doors-to-distributed-hydrogen-markets/>, 2 pages.

Giddey et al., "Ammonia as a Renewable Energy Transportation Media," ACS Sustainable Chemistry & Engineering, Oct. 2017, 5(11): 10231-10239, 35 pages.

Lucentini et al., "Review of the Decomposition of Ammonia to Generate Hydrogen," Industrial & Engineering Chemistry Research, May 2021, 60(51): 18560-18611.

Malico et al., "Design of a trigeneration system using a high-temperature fuel cell," Int. J. Energy Res., 2009, 33:144-151, 8 pages.

Manliclic, presentation 2014 "Tri-Generation Fuel Cell Technologies for Location-Specific Applications" Project ID: AN047.

npl.co.uk [online], "Hydrogen purity for fuel cell vehicles," available on or before Aug. 15, 2022 via Internet Archive: Wayback Machine URL <http://web.archive.org/web/20220815193247/https://www.npl.co.uk/products-services/environmental/hydrogen-fuel-cell-car>, retrieved on Jan. 11, 2023 from URL <https://www.npl.co.uk/products-services/environmental/hydrogen-purity-for-fuel-cell-vehicles>, 5 pages.

Ohi et al., "Hydrogen Fuel Quality Specifications for Polymer Electrolyte Fuel Cells in Road Vehicles," U.S. Department of Energy, Energy Efficiency & Renewable Energy, Nov. 2, 2016, 86 pages.

Park et al., "A catalytic composite membrane reactor system for hydrogen production from ammonia using steam as a sweep gas," Journal of Membrane Science, 2020, 614, 118483, 42 pages.

Patel et al., "Co-Production of Renewable Hydrogen and Electricity: Technology Development and Demonstration," ECS Transactions, May 2010, 26(1):493-504, 12 pages.

Pe'rez-Fortes et al., "Design of a Pilot SOFC System for the Combined Production of Hydrogen and Electricity under Refueling Station Requirements," Fuel Cells 19, 2019, 4, 389-407, 19 pages.

Shah et al., "Compact ammonia reforming at low temperature using catalytic membrane reactors," Journal of Membrane Science, 2022, 644, 120147, 25 pages.

Valera-Medina et al., "Ammonia for power," Progress in Energy and Combustion Science, 2018, 69:63-102, 40 pages.

Yu et al., "Combined Hydrogen, Heat and Power (CHHP) pilot plant design," International Journal of Hydrogen Energy, 2013, 38, 8 pages.

Zhang et al., "Efficient Ammonia Decomposition in a Catalytic Membrane Reactor to Enable Hydrogen Storage and Utilization," ACS Sustainable Chemistry & Engineering, 2019, 7(6): 5975, 29 pages.

Zhang et al., "Techno-economic comparison of green ammonia production processes" Applied Energy 259, Feb. 2020, 12 pages.

PCT International Search Report and Written Opinion in International Appln. No. PCT/US2022/077703, dated Jan. 27, 2023.

COMBINED HYDROGEN AND ELECTRICITY PRODUCTION FROM AQUEOUS AMMONIA FEED

CROSS-REFERENCE TO RELATED PATENT APPLICATIONS

This application is a divisional of U.S. patent application Ser. No. 17/938,223, filed Oct. 5, 2022, which claims the benefit of priority to U.S. Provisional Patent Application No. 63/252,780, filed Oct. 6, 2021, the contents of which are incorporated by reference herein.

TECHNICAL FIELD

The present disclosure is directed to producing hydrogen and electricity from ammonia. More specifically, ammonia is catalyzed to form hydrogen and residual ammonia. The residual ammonia is combusted in a micro turbine to produce electricity and heat.

BACKGROUND

Converting oil or natural gas to hydrogen and electricity can have a major impact on lowering the emissions footprint of the transportation sector. By producing hydrogen via advanced processes, and combining this technology with carbon capture, utilization and storage (CCUS), hydrogen has the potential to make a significant contribution to a cleaner, more secure, and affordable energy future. In order to transport hydrogen over long distances at large-scale, it can be converted to ammonia, which can then be easily shipped in liquid form at moderate temperature and pressure conditions.

Further, while ammonia can be burned as a fuel, technologies to directly use ammonia, such as internal combustion engines, are still in development. Thus, techniques to incorporate ammonia streams into current technologies would be useful.

SUMMARY

An embodiment described in examples provides a system for producing hydrogen and electrical power from an aqueous ammonia solution. The system includes a distillation unit to produce ammonia gas from the aqueous ammonia solution, a compression unit to boost the pressure of the ammonia gas, a membrane separator to catalytically convert the ammonia gas to nitrogen and hydrogen and remove the hydrogen as a permeate, and a micro turbine to combust a retentate to generate energy.

Another embodiment described in examples provides a method for producing hydrogen and electrical power from an aqueous ammonia solution. The method includes distilling the aqueous ammonia solution to produce ammonia gas and a waste stream, compressing the ammonia gas, catalytically converting the ammonia gas to nitrogen and the hydrogen, separating the hydrogen in a membrane separator as a permeate, and combusting a retentate in a micro turbine to generate the electrical power.

DETAILED DESCRIPTION

Ammonia is an energy dense compound that can be directly utilized for energy production, for example, by combustion in a gas turbine or a burner on a boiler. Further, ammonia is a carbon free material that can be synthesized from natural gas with the capture of carbon dioxide for disposal or further uses, e.g., forming what is termed blue ammonia. In addition, ammonia can be synthesized from hydrogen generated from electrolysis, using power provided by renewable resources, such as wind or solar. Ammonia generated using these techniques is termed green ammonia. Ammonia is also easier to ship than liquid hydrogen or liquefied natural gas, with a liquefaction temperature that is much higher than either of these materials.

Accordingly, significant research is being performed into the use of ammonia as a potential low-carbon fuel for mobility and power generation applications. However, liquid ammonia is toxic and needs to be handled with proper care. Solutions of aqueous ammonia are more easily transported.

Embodiments described in examples herein provide methods and systems for using aqueous ammonia solutions to produce hydrogen and electricity. The aqueous ammonia is distilled to form an ammonia gas stream. The ammonia gas stream can then be processed in a hydrogen separation membrane system, for example, using a palladium or palladium-alloy membrane, to produce a permeate that is a purified hydrogen stream that can be used for fuel cell electric vehicles (FCEVs). A retentate stream, for example, including nitrogen, hydrogen, unreacted ammonia and some water vapor, is combusted in a micro turbine to produce electricity, for example, for use in charging electric vehicles (EVs).

The techniques described produce multiple useful products, including hydrogen, electricity, and heat. The system may be a portable unit used on-site at a refueling station for FCEVs and EVs, using aqueous ammonia as the fuel.

Figure 1:
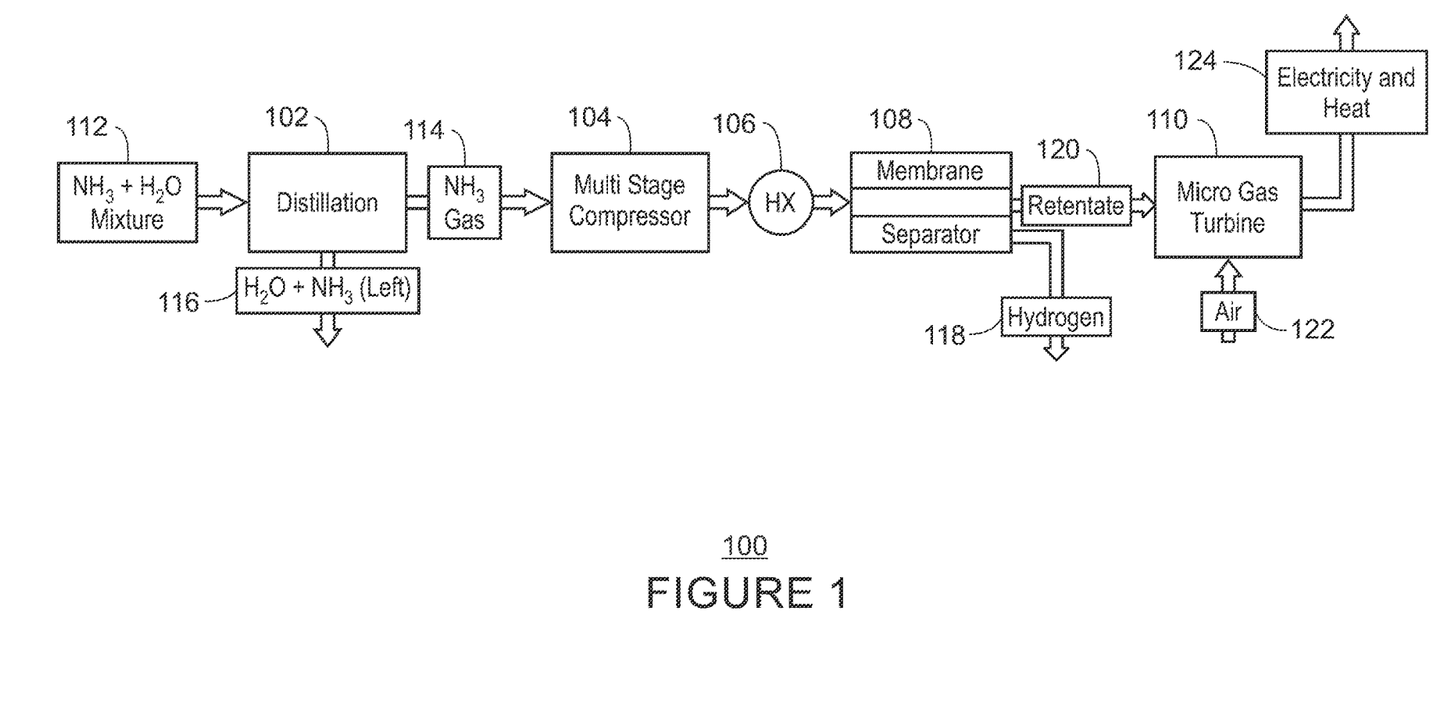
FIG. 1 is a schematic diagram of a system for converting aqueous ammonia to hydrogen and electricity.

FIG. 1 is a schematic diagram of a system 100 for converting aqueous ammonia to hydrogen and electricity. The system includes a distillation unit 102, a compression unit 104, a heat exchange unit 106, a membrane separator 108, and a micro gas turbine or micro turbine 110.

The feed to the system is an aqueous ammonia solution 112. In some embodiments, the aqueous ammonia solution 112 is between about 20 wt. % and 40 wt. % ammonia in water. In some embodiments, the aqueous ammonia solution 112 is between about 20 wt. % and 33 wt. % ammonia in water. In some embodiments, the aqueous ammonia solution is about 28 wt. % ammonia in water. However, it can be noted that any concentrations can be used, for example, concentrations less than 20% may be used in some embodiments.

The aqueous ammonia solution 112 is fed to the distillation unit 102, for example, using a liquid pump. In some embodiments, the distillation unit 102 is a multi-stage distillation column, in which most of ammonia in the aqueous ammonia solution 112 is distillated to form an ammonia gas stream 114. The waste stream 116 from the distillation unit 102 includes water and some residual ammonia. The waste stream 116 can be collected in a tank and returned to a production facility to be used in producing the aqueous ammonia solution 112.

In some embodiments, the separation in the distillation unit 102 is enhanced by the adjustment of the pH of the aqueous ammonia solution 112 to be greater than about 8, or greater than about 10, or between about 8 and 12, or between about 10 and 12. This may be performed by the addition of sodium hydroxide to the aqueous ammonia solution 112 in a storage tank upstream of the distillation.

The ammonia gas stream 114 is compressed in a compression unit 104. In an embodiment, the compression unit 104 is a multistage compressor that can include two, three, or more compressor stages to boost the pressure to the operating pressure of the membrane separator 108, as shown in the process flowsheet of FIG. 2. In some embodiments, a heat exchange unit 106, for example, including one or more heat exchangers, are used to heat the ammonia gas stream 114 prior to feeding the ammonia gas stream 114 to the membrane separator 108.

The membrane separator 108 uses a high-temperature, hydrogen selective membrane, for example, made from palladium, a palladium alloy, or any other hydrogen separation membranes. In some embodiments, the membrane is a protonic conducting-membrane based on a ceramic. For example, the membrane may be a Y-doped $BaZrO_3$-based oxide, among others. The surface of the membrane may include catalyst sites that includes a metal such ruthenium, rhenium, platinum, palladium, or nickel, or combinations thereof, among others.

In the membrane separator 108, the catalytic conversion of the ammonia gas stream 114 and the selective separation of the hydrogen as the permeate stream 118 take place at the same time. The catalytic conversion of the ammonia and the recovery of the hydrogen in the membrane separator can be optimized through controlling the pressure by controlling the membrane surface area. Controlling the flow rate may also be used to optimize the process.

In some embodiments, the catalyst is a catalyst bed placed in an outer tube of a tubular reactor, where the inner portion of the tubular reactor is separated from the catalyst bed by the hydrogen selective membrane. The catalyst may include any number of supported metals, such as nickel, ruthenium, or barium, among others. The support may be a zirconia, alumina, or zeolite based material. In one embodiment, the catalyst is ruthenium supported on a yttria-stabilized zirconia (YSZ).

In some embodiments, the tubular reactor is operated at a temperature between about 350° C. and about 580° C., or at a temperature of between about 400° C. and about 530° C., or at a temperature of about 515° C. However, any temperature in the range may be selected based on the ammonia input and hydrogen output desired. In some embodiments, the tubular reactor is operated at a pressure between about 4 bar and about 40 bar, or between about 20 bar and 30 bar, or about 25 bar. As for temperature, the operating pressure may be based on the ammonia input and hydrogen output desired.

In some embodiments, the ammonia is decomposed into nitrogen and hydrogen through an electrochemical process. This may be performed by passing the ammonia through a solid acid electrochemical cell, prior to separating hydrogen from the resulting nitrogen using a membrane.

In some embodiments, the hydrogen in the permeate stream 118 is further treated to reach the purity specifications used for fuel cell vehicles (FCEVs). In some embodiments, the purity complies with the ISO FDIS 14687-2 or the SAE J2719 specifications. In some embodiments, the hydrogen in the permeate stream is purified to a concentration of greater than about 95% hydrogen by volume, or to a concentration of greater than about 99% hydrogen by volume, or to a concentration of greater than about 99.9% hydrogen by volume, wherein the balance is inert gas, such as nitrogen. The hydrogen may then be compressed to about 400 bar (about 40,000 kPa) to about 900 bar (about 90,000 kPa) as needed for dispensing, for example, to FCEVs or other uses. The retentate stream 120, for example, including nitrogen, hydrogen, unreacted ammonia, and water vapor, is routed to the micro turbine 110.

In some embodiments, the micro turbine 110 is a commercial micro turbine generator, for example, available from Capstone Turbine Corp. of Los Angeles California or Aurelia Turbines, Oy. of Lappeenranta, Finland, among many others. In the micro turbine, the retentate stream 120 is combusted with air 122 to produce energy 124, e.g., in the form of electricity and hot exhaust gas. In some embodiments, a portion of the heat from the hot exhaust gas of the micro turbine 110 can be recuperated, e.g., by heating the incoming stream of air 122 provided to the micro turbine 110 in a recuperator, increasing the efficiency of the micro turbine 110. In some embodiments, the heat is not recuperated, but completely used for other portions of the process. Depending on the process needs, a partial recuperation may be performed, increasing the amount of heat left for other portions of the process.

The energy 124 produced is used to power the process. The exhaust gas is used for providing heat to the membrane separator 108, as the catalytic conversion of ammonia to hydrogen and nitrogen is an endothermic reaction. Further, the exhaust gas provides the heat used for the boiler, or boilers, in the distillation until 102, e.g., to vaporize the ammonia in the multi-stage distillation column. The electricity produced by the micro turbine 110 is used to power the process, with the excess electricity being provided to charging stations for EVs.

Figure 2:
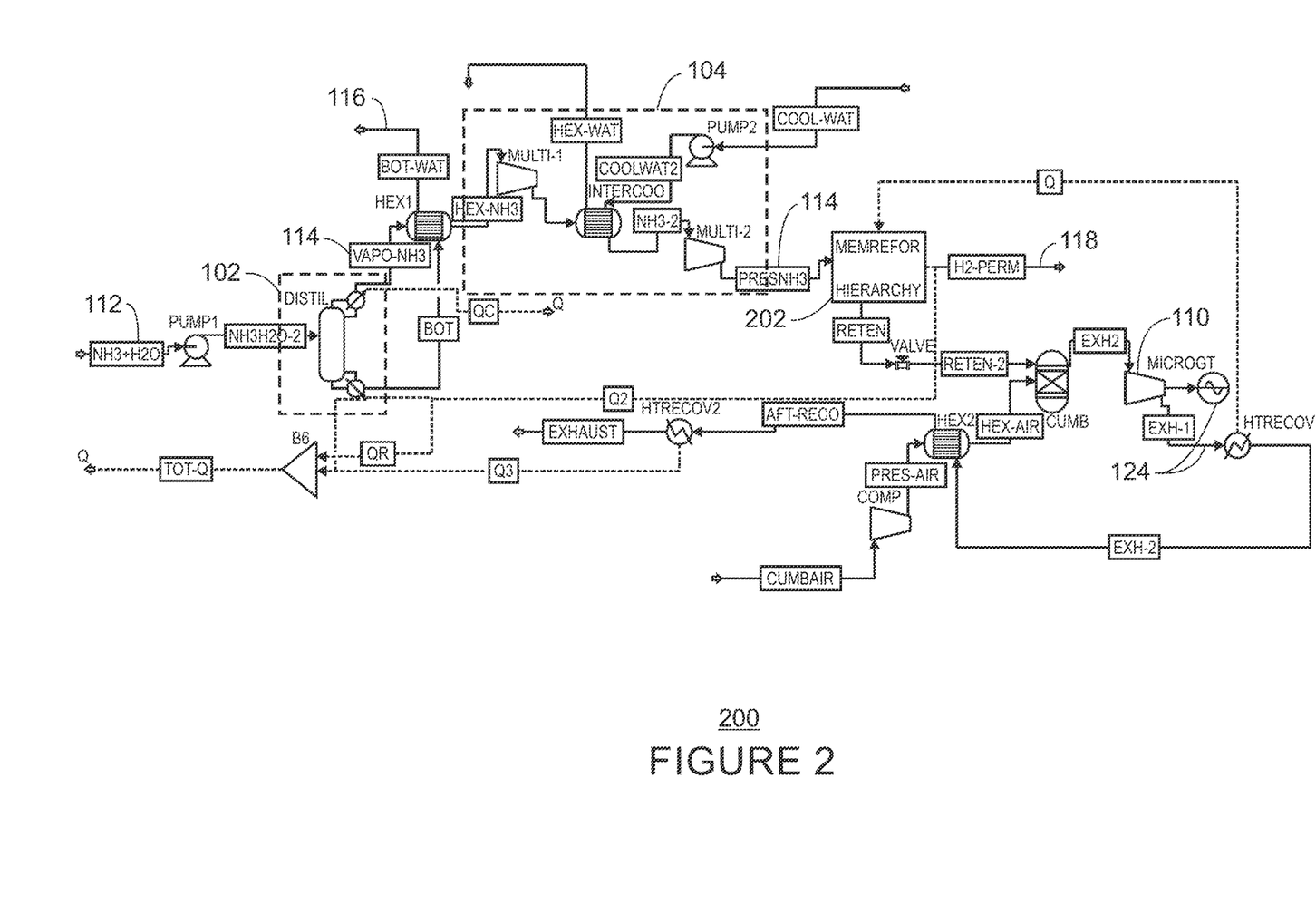
FIG. 2 is a process flowsheet of a model of the system.

FIG. 2 is a process flowsheet 200 of a model of the system 100. Like numbers are as described with respect to FIG. 1. The process was modeled using Aspen plus (version 10) based process model was developed and all the components of the process are modeled. The heat exchange unit 106 and membrane separator 108 are shown as a block 202 in FIG. 2, and are broken out into individual units on FIG. 3. The results obtained from the modeling are shown in the tables below. The identifying tags on the streams in the process flowsheet correspond to the columns in the tables below.

Figure 3:
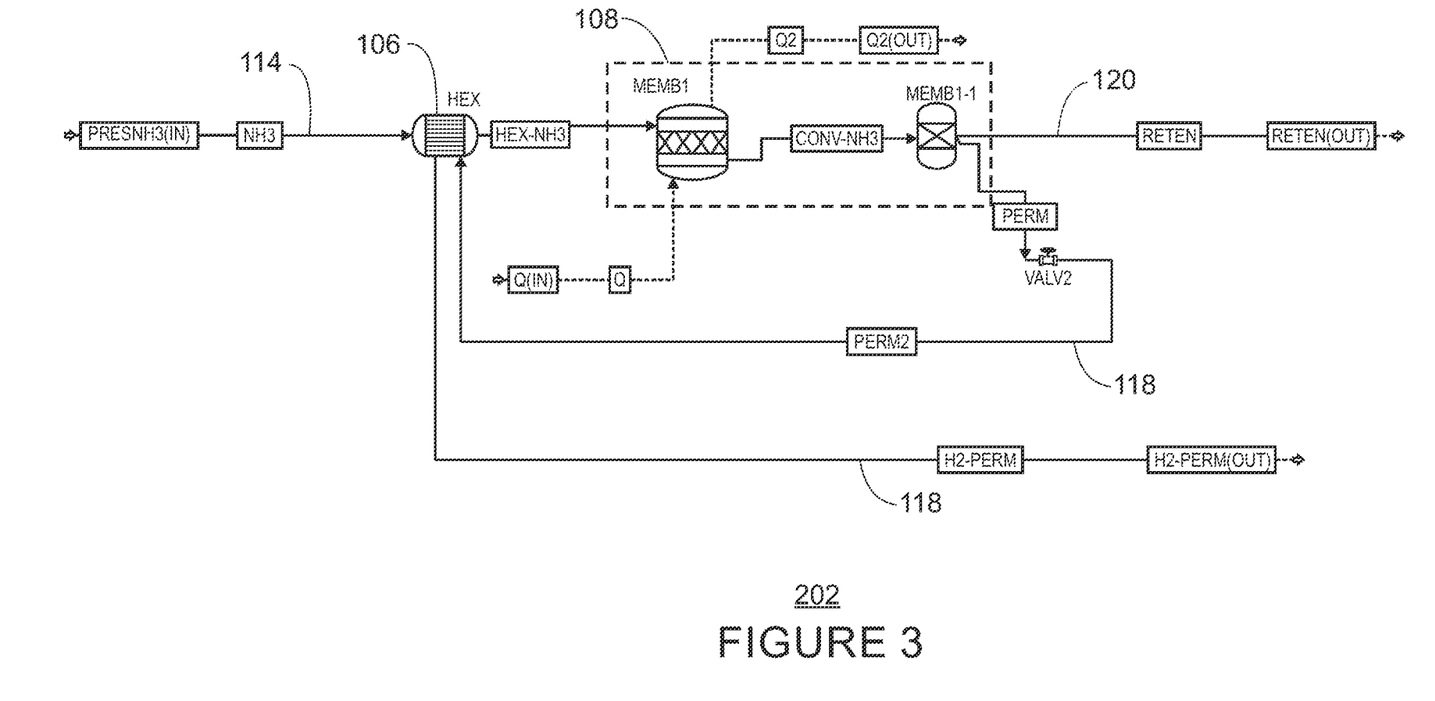
FIG. 3 is a process flowsheet of a model of the block showing the heat exchange unit and membrane separator.

FIG. 3 is a process flowsheet 300 of a model of the block 202 showing the heat exchange unit 106 and membrane separator 108. For modeling purposes, the membrane separator 108 was broken out into two units. In the first unit, MEMB1, the catalytic conversion of the ammonia is modeled. In the second unit, MEMB1-1, the separation of the permeate stream 118 from the retentate stream 120 is modeled.

Three scenarios were modeled at different efficiencies for the micro turbine. These were 39.2%, 28.5%, and 23.5%, with the assumptions and results shown in the examples below.

Example 1: Process Simulation Results Assuming a Micro Turbine Efficiency of 39.2%

In this simulation, the feed composition was an aqueous ammonia solution 112 that included 25% ammonia and 75% water, by weight. The distillation was performed in a distillation unit 102 at 1.1 bar (110 kPa), which recovered 80% of the ammonia, by weight, at 100% purity.

The membrane separator 108 was operated at 8.1 bar (810 kPa) and a temperature of 450° C. The simulation showed a 74 wt. % conversion of the ammonia in the ammonia gas stream 114 and a 75 wt. % recovery of the hydrogen as the permeate stream 118.

The micro turbine 110 was operated at 6.7 bar (670 kPa) with an air to fuel ratio of 2.4. In this simulation, the turbine efficiency was set at 39.2%, corresponding to an isoentropic efficiency of 95% and a turbine efficiency of 85.8%. The outlet temperature of the micro turbine 110 was 674° C. and 194 kW were produced.

It was assumed that the heat recovery from the exhaust gas took the exhaust gas temperature from 674° C. to 470° C. and then to 150° C. The heat from the cooling of the exhaust was used for the membrane separator 108 and the boiler in the distillation unit 102. The produced electricity was used for powering the process.

The process flows calculated by the simulation are shown in Tables 1A-1C. The results of the simulation are summarized in Table 2.

TABLE 2

Results of the simulation assuming a turbine efficiency of 39.2%.

| NH3 conversion | H2 recovery | Turbine efficiency | Produced electricity | Net output electricity | Overall system efficiency |
|---|---|---|---|---|---|
| 74% | 75% | 39.20% | 194 kW | 164 kW | 79.30% |

Example 2: Process Simulation Results Assuming a Micro Turbine Efficiency of 28.5%

In this simulation, the feed composition was an aqueous ammonia solution 112 that included 25% ammonia and 75% water, by weight. The distillation was performed in a distillation unit 102 at 1.1 bar (110 kPa), which recovered 80% of the ammonia, by weight, at 100% purity.

The membrane separator 108 was operated at 8.1 bar (810 kPa) and a temperature of 450° C. The simulation showed a 74 wt. % conversion of the ammonia in the ammonia gas stream 114 and a 75 wt. % recovery of the hydrogen as the permeate stream 118.

The micro turbine 110 was operated at 6.7 bar (670 kPa) with an air to fuel ratio of 2.4. In this simulation, the turbine efficiency was set at 28.5%, corresponding to an isoentropic efficiency of 68% and a turbine efficiency of 85.8%. The outlet temperature of the micro turbine 110 was 674° C. and 141 kW were produced.

It was assumed that the heat recovery from the exhaust gas took the exhaust gas temperature from 674° C. to 470° C. and then to 150° C. The heat from the cooling of the exhaust was used for the membrane separator 110 and the boiler in the distillation unit 102. The produced electricity was used for powering the process.

The process flows calculated by the simulation are shown in Tables 3A-3C. The results of the simulation are summarized in Table 4.

TABLE 4

| NH3 conversion | H2 recovery | Turbine efficiency | Produced electricity | Net output electricity | Overall system efficiency |
|---|---|---|---|---|---|
| 74% | 75% | 28.50% | 141 kW | 110 KW | 74.20% |

Example 3: Process Simulation Results Assuming a Micro Turbine Efficiency of 23.5%

In this simulation, the feed composition was an aqueous ammonia solution 112 that included 25% ammonia and 75% water, by weight. The distillation was performed in a distillation unit 102 at 1.1 bar (110 kPa), which recovered 80% of the ammonia, by weight, at 100% purity.

The membrane separator 108 was operated at 8.1 bar (810 kPa) and a temperature of 450° C. The simulation showed a 74 wt. % conversion of the ammonia in the ammonia gas stream 114 and a 75 wt. % recovery of the hydrogen as the permeate stream 118.

The micro turbine 110 was operated at 6.7 bar (670 kPa) with an air to fuel ratio of 2.4. In this simulation, the turbine efficiency was set at 23.5%, corresponding to an isoentropic efficiency of 60% and a turbine efficiency of 85.8%. The outlet temperature of the micro turbine 110 was 674° C. and 141 kW were produced.

It was assumed that the heat recovery from the exhaust gas took the exhaust gas temperature from 674° C. to 470° C. and then to 150° C. The heat from the cooling of the exhaust was used for the membrane separator 110 and the boiler in the distillation unit 102. The produced electricity was used for powering the process.

The process flows calculated by the simulation are shown in Tables 5A-5C. The results of the simulation are summarized in Table 6.

TABLE 6

| NH3 conversion | H2 recovery | Turbine efficiency | Produced electricity | Net output electricity | Overall system efficiency |
|---|---|---|---|---|---|
| 74% | 75% | 23.50% | 116 kW | 85 KW | 71.90% |

Figure 4:
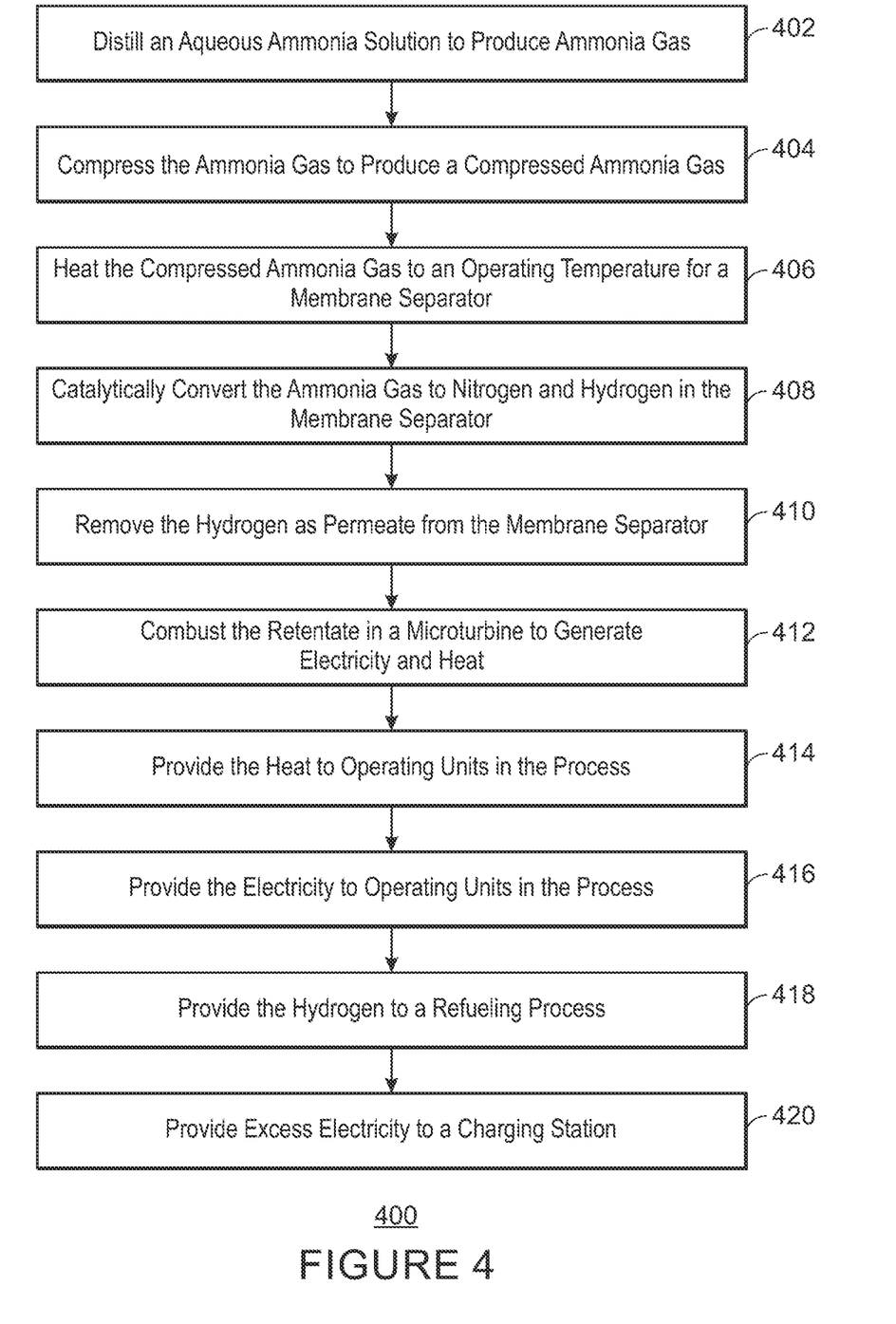
FIG. 4 is a process flow diagram of a method for producing hydrogen and electricity from aqueous ammonia.

FIG. 4 is a process flow diagram of a method 400 for producing hydrogen and electricity from aqueous ammonia. The method starts at block 402 with the distillation of an aqueous ammonia solution to produce ammonia gas. At block 404, the ammonia gas is compressed, producing a compressed ammonia gas. At block 406, the compressed ammonia gas is heated to an operating temperature for a membrane separator.

At block 408, the ammonia gas is catalytically converted to hydrogen and nitrogen in the membrane separator. As described herein, in some embodiments, the ammonia is decomposed electrochemically. At block 410, hydrogen is removed as permeate from the membrane separator.

At block 412, the retentate is combusted in a micro turbine to generate energy. The energy includes heat from the exhaust from the micro turbine and electrical power.

At block 414, the heat is provided to operating units in the process. As described herein, that includes the membrane separator and the boiler for the distillation unit.

At block 416, the electricity generated is provided to operating units in the process. At block 418, the hydrogen is provided to a refueling process or for external uses. This may include purifying the hydrogen to meet the specifications used in the refueling process. At block 420, excess electricity is provided for the charging of vehicles, or other uses outside of the process.

Embodiments

An embodiment described in examples, provides a system for producing hydrogen and electrical power from an aqueous ammonia solution. The system includes a distillation unit to produce ammonia gas from the aqueous ammonia solution, a compression unit to boost the pressure of the ammonia gas, a membrane separator to catalytically convert the ammonia gas to nitrogen and hydrogen and remove the hydrogen as a permeate, and a micro turbine to combust a retentate to generate energy.

In an aspect, the distillation unit includes a multistage distillation column.

In an aspect, the compression unit includes a multi-stage compressor.

In an aspect, the system includes a heat exchanger downstream of the compression unit to heat the ammonia gas to an operating temperature for the membrane separator.

In an aspect, a membrane in the membrane separator includes a palladium. In an aspect, a membrane in the membrane separator includes a palladium alloy.

In an aspect, the micro turbine includes a recuperator.

In an aspect, the retentate includes ammonia, hydrogen, or nitrogen, or any combinations thereof.

In an aspect, the system includes a fueling station for fuel cell electric vehicles (FECV). In an aspect, the system includes a charging station for electric vehicles (EV).

In aspect, the energy includes heat from an exhaust stream of the micro turbine. In an aspect, the energy includes electricity from a generator coupled to the micro turbine.

Another embodiment described in examples provides a method for producing hydrogen and electrical power from an aqueous ammonia solution. The method includes distilling the aqueous ammonia solution to produce ammonia gas and a waste stream, compressing the ammonia gas, catalytically converting the ammonia gas to nitrogen and the hydrogen, separating the hydrogen in a membrane separator as a permeate, and combusting a retentate in a micro turbine to generate the electrical power.

In an aspect, the method includes raising the ammonia gas to an operating temperature for the membrane separator after compressing the ammonia gas. In an aspect, the method includes providing heat from an exhaust of the micro turbine to a heat exchanger to heat the ammonia gas. In an aspect, providing heat from an exhaust of the micro turbine to a boiler for distilling the aqueous ammonia solution. In an aspect, the method includes providing the electrical power to operating units producing hydrogen and electrical power from the aqueous ammonia solution.

In an aspect, the method includes purifying the hydrogen to meet a fuel cell specification. In an aspect, the method includes compressing the hydrogen for a refueling operation for a fuel cell electrical vehicle (FCEV). In an aspect, the method includes providing the electrical power to a charging station for an electrical vehicle (EV).

Other implementations are also within the scope of the following claims.

TABLE 1A

Process simulation results assuming a micro turbine efficiency of 39.2%.

| | Units | NH3 + H2O | NH3H2O-2 | VAPO-NH3 | HEX-NH3 | COMP. NH3 | NH3-2 | PRESNH3 | MEM-REFOR.-NH3 |
|---|---|---|---|---|---|---|---|---|---|
| Phase | | Liquid Phase | Liquid Phase | Vapor Phase | Vapor Phase | Vapor Phase | Vapor Phase | Vapor Phase | Vapor Phase |
| Temperature | C | 25.0 | 25.1 | −31.7 | 25.0 | 133.1 | 23.0 | 122.2 | 122.2 |
| Pressure | bar | 3.0 | 4.0 | 1.1 | 1.1 | 3.1 | 3.1 | 8.1 | 8.1 |
| Mole Flows | | | | | | | | | |
| H2O | mol/min | 750.0 | 750.0 | 0.0 | 0.0 | 0.0 | 0.0 | 0.0 | 0.0 |
| H2 | mol/min | 0.0 | 0.0 | 0.0 | 0.0 | 0.0 | 0.0 | 0.0 | 0.0 |
| O2 | mol/min | 0.0 | 0.0 | 0.0 | 0.0 | 0.0 | 0.0 | 0.0 | 0.0 |
| N2 | mol/min | 0.0 | 0.0 | 0.0 | 0.0 | 0.0 | 0.0 | 0.0 | 0.0 |
| NH3 | mol/min | 250.0 | 250.0 | 200.0 | 200.0 | 200.0 | 200.0 | 200.0 | 200.0 |
| Mass Flows | | | | | | | | | |
| H2O | kg/day | 19456.5 | 19456.5 | 0.0 | 0.0 | 0.01 | 0.0 | 0.0 | 0.0 |
| H2 | kg/day | 0.0 | 0.0 | 0.0 | 0.0 | 0.0 | 0.0 | 0.0 | 0.0 |
| O2 | kg/day | 0.0 | 0.0 | 0.0 | 0.0 | 0.0 | 0.0 | 0.0 | 0.0 |
| N2 | kg/day | 0.0 | 0.0 | 0.0 | 0.0 | 0.0 | 0.0 | 0.0 | 0.0 |
| NH3 | kg/day | 6131.0 | 6131.0 | 4904.8 | 4904.8 | 4904.8 | 4904.8 | 4904.8 | 4904.8 |

TABLE 1B

Process simulation results assuming a micro turbine efficiency of 39.2% (cont'd).

| | Units | MEM-REFOR.-HEX-NH3 | MEM-REFOR.-CONV-NH3 | MEM-REFOR.-PERM | MEM-REFOR.-PERM 2 | MEM-REFOR.-H2-PERM | MEM-REFOR.-RETEN | H2-PERM | RETEN | RETEN-2 | CUM-BAIR | PRES-AIR |
|---|---|---|---|---|---|---|---|---|---|---|---|---|
| Phase | | Vapor Phase | Vapor Phase | Vapor Phase | Vapor Phase | Vapor Phase | Vapor Phase | Vapor Phase | Vapor Phase | Vapor Phase | Vapor Phase | Vapor Phase |
| Temperature | C | 300.0 | 450.0 | 450.0 | 450.0 | 148.4 | 450.0 | 148.4 | 450.0 | 450.0 | 25.0 | 246.8 |
| Pressure | bar | 8.1 | 8.1 | 8.1 | 1.1 | 1.1 | 8.1 | 1.1 | 8.1 | 8.1 | 6.7 | 1.0 | 6.7 |

TABLE 1B-continued

Process simulation results assuming a micro turbine efficiency of 39.2% (cont'd).

| | Units | MEM-REFOR.-HEX-NH3 | MEM-REFOR.-CONV-NH3 | MEM-REFOR.-PERM | MEM-REFOR.-PERM 2 | MEM-REFOR.-H2-PERM | MEM-REFOR.-RETEN | H2-PERM | RETEN | RETEN-2 | CUM-BAIR | PRES-AIR |
|---|---|---|---|---|---|---|---|---|---|---|---|---|
| | | | | | Mole Flows | | | | | | | |
| H2O | mol/min | 0.0 | 0.0 | 0.0 | 0.0 | 0.0 | 0.0 | 0.0 | 0.0 | 0.0 | 0.0 | 0.0 |
| H2 | mol/min | 0.0 | 222.0 | 167.3 | 167.3 | 167.3 | 54.7 | 167.3 | 54.7 | 54.7 | 0.0 | 0.0 |
| O2 | mol/min | 0.0 | 0.0 | 0.0 | 0.0 | 0.0 | 0.0 | 0.0 | 0.0 | 0.0 | 256.1 | 256.1 |
| N2 | mol/min | 0.0 | 74.0 | 0.0 | 0.0 | 74.0 | 0.0 | 74.0 | 74.0 | 970.8 | 970.8 |
| NH3 | mol/min | 200.0 | 52.0 | 0.0 | 0.0 | 0.0 | 52.0 | 0.0 | 52.0 | 52.0 | 0.0 | 0.0 |
| | | | | | Mass Flows | | | | | | | |
| H2O | kg/day | 0.0 | 0.0 | 0.0 | 0.0 | 0.0 | 0.0 | 0.0 | 0.0 | 0.0 | 0.0 | 0.0 |
| H2 | kg/day | 0.0 | 644.4 | 485.6 | 485.6 | 485.6 | 158.9 | 485.6 | 158.9 | 158.9 | 0.0 | 0.0 |
| O2 | kg/day | 0.0 | 0.0 | 0.0 | 0.0 | 0.0 | 0.0 | 0.0 | 0.0 | 0.0 | 11802.7 | 11802.7 |
| N2 | kg/day | 0.0 | 2985.1 | 0.0 | 0.0 | 0.0 | 2985.1 | 0.0 | 2985.3 | 2985.1 | 39161.1 | 39161.1 |
| NH3 | kg/day | 4904.8 | 1275.2 | 0.0 | 0.0 | 0.0 | 1275.2 | 0.0 | 1275.2 | 1275.2 | 0.0 | 0.0 |

TABLE 1C

Process simulation results assuming a micro turbine efficiency of 39.2% (cont'd).

| | Units | HEX-AIR | EXH2 | EXH-1 | EXH-2 | AFT-RECO | EXHAUST | BOT | BOT-WAT | COOL-WAT | COOLWAT2 | HEX-WAT |
|---|---|---|---|---|---|---|---|---|---|---|---|---|
| Phase | | Vapor Phase | Vapor Phase | Vapor Phase | Vapor Phase | Vapor Phase | Vapor Phase | Liquid Phase | Liquid Phase | Liquid Phase | Liquid Phase | Liquid Phase |
| Temperature | C | 450.0 | 1081.6 | 673.6 | 470.0 | 295.1 | 150.0 | 37.7 | 31.2 | 20.0 | 20.0 | 20.6 |
| Pressure | bar | 6.7 | 6.7 | 1.1 | 1.1 | 1.1 | 1.1 | 1.1 | 1.1 | 1.0 | 1.2 | 1.2 |
| | | | | | | Mole Flows | | | | | | |
| H2O | mol/min | 0.0 | 132.7 | 132.7 | 132.7 | 132.7 | 132.7 | 750.0 | 750.0 | 20000.0 | 20000.0 | 20000.0 |
| H2 | mol/min | 0.0 | 0.0 | 0.0 | 0.0 | 0.0 | 0.0 | 0.0 | 0.0 | 0.0 | 0.0 | 0.0 |
| O2 | mol/min | 256.1 | 189.8 | 189.8 | 189.8 | 189.8 | 189.8 | 0.0 | 0.0 | 0.0 | 0.0 | 0.0 |
| N2 | mol/min | 970.8 | 1070.8 | 1070.8 | 1070.8 | 1070.8 | 1070.8 | 0.0 | 0.0 | 0.0 | 0.0 | 0.0 |
| NH3 | mol/min | 0.0 | 0.0 | 0.0 | 0.0 | 0.0 | 0.0 | 0.0 | 50.0 | 0.0 | 0.0 | 0.0 |
| | | | | | | Mass Flows | | | | | | |
| H2O | kg/day | 0.0 | 3443.2 | 3443.2 | 3443.2 | 3443.2 | 3443.2 | 19456.5 | 19456.5 | 518840.1 | 518840.1 | 518840.1 |
| H2 | kg/day | 0.0 | 0.0 | 0.0 | 0.0 | 0.0 | 0.0 | 0.0 | 0.0 | 0.0 | 0.0 | 0.0 |
| O2 | kg/day | 11802.7 | 8744.8 | 8744.8 | 8744.8 | 8744.8 | 8744.8 | 0.0 | 0.0 | 0.0 | 0.0 | 0.0 |
| N2 | kg/day | 39161.1 | 43195.1 | 43195.1 | 43195.1 | 43195.1 | 43195.1 | 0.0 | 0.0 | 0.0 | 0.0 | 0.0 |
| NH3 | kg/day | 0.0 | 0.0 | 0.0 | 0.0 | 0.0 | 0.0 | 0.0 | 1226.2 | 1226.2 | 0.0 | 0.0 |

TABLE 3A

Process simulation results assuming a micro turbine efficiency of 28.5%.

| | Units | NH3 + H2O | NH3H2O-2 | VAPO-NH3 | HEX-NH3 | COMP-NH3 | NH3-2 | PRESNH3 | MEM-REFOR.-NH3 | MEM-REFOR.-HEX-NH3 | MEM-REFOR.-CONV-NH3 | MEM-REFOR.-PERM |
|---|---|---|---|---|---|---|---|---|---|---|---|---|
| Phase | | Liquid Phase | Liquid Phase | Vapor Phase | Vapor Phase | Vapor Phase | Vapor Phase | Vapor Phase | Vapor Phase | Vapor Phase | Vapor Phase | Vapor Phase |
| Temperature | C | 25.0 | 25.1 | −31.7 | 25.0 | 133.3 | 23.0 | 122.2 | 122.2 | 300.0 | 450.0 | 450.0 |
| Pressure | bar | 3.0 | 4.0 | 1.1 | 1.1 | 3.1 | 3.1 | 8.1 | 8.1 | 8.1 | 8.1 | 8.1 |

TABLE 3A-continued

Process simulation results assuming a micro turbine efficiency of 28.5%.

| | Units | NH3 + H2O | NH3H2O-2 | VAPO-NH3 | HEX-NH3 | COMP-NH3 | NH3-2 | PRESNH3 | MEM-REFOR.-NH3 | MEM-REFOR.-HEX-NH3 | MEM-REFOR.-CONV NH3 | MEM-REFOR.-PERM |
|---|---|---|---|---|---|---|---|---|---|---|---|---|
| | | | | | | Mole Flows | | | | | | |
| H2O | mol/min | 750.0 | 750.0 | 0.0 | 0.0 | 0.0 | 0.0 | 0.0 | 0.0 | 0.0 | 0.0 | 0.0 |
| H2 | mol/min | 0.0 | 0.0 | 0.0 | 0.0 | 0.0 | 0.0 | 0.0 | 0.0 | 0.0 | 222.0 | 167.3 |
| O2 | mol/min | 0.0 | 0.0 | 0.0 | 0.0 | 0.0 | 0.0 | 0.0 | 0.0 | 0.0 | 0.0 | 0.0 |
| N2 | mol/min | 0.0 | 0.0 | 0.0 | 0.0 | 0.0 | 0.0 | 0.0 | 0.0 | 0.0 | 74.0 | 0.0 |
| NH3 | mol/min | 250.0 | 250.0 | 200.0 | 200.0 | 200.0 | 200.0 | 200.0 | 200.0 | 200.0 | 52.0 | 0.0 |
| | | | | | | Mass Flows | | | | | | |
| H2O | kg/day | 19456.8 | 19456.5 | 0.0 | 0.0 | 0.0 | 0.0 | 0.0 | 0.0 | 0.0 | 0.0 | 0.0 |
| H2 | kg/day | 0.0 | 0.0 | 0.0 | 0.0 | 0.0 | 0.0 | 0.0 | 0.0 | 0.0 | 644.4 | 485.6 |
| O2 | kg/day | 0.0 | 0.0 | 0.0 | 0.0 | 0.0 | 0.0 | 0.0 | 0.0 | 0.0 | 0.0 | 0.0 |
| N2 | kg/day | 0.0 | 0.0 | 0.0 | 0.0 | 0.0 | 0.0 | 0.0 | 0.0 | 0.0 | 2985.1 | 0.0 |
| NH3 | kg/day | 6131.0 | 6131.0 | 4904.8 | 4904.8 | 4904.8 | 4904.8 | 4904.8 | 4904.8 | 4904.8 | 1275.2 | 0.0 |

TABLE 3B

Process simulation results assuming a micro turbine efficiency of 28.5% (cont'd).

| | Units | MEM-REFOR.-PERM 2 | MEM-REFOR.-H2-PERM | MEM-REFOR.-RETEN | H2-PERM | RETEN | RETEN-2 | CUMBAIR | PRES-AIR | HEX-AIR | EXH2 |
|---|---|---|---|---|---|---|---|---|---|---|---|
| Phase | | Vapor Phase | Vapor Phase | Vapor Phase | Vapor Phase | Vapor Phase | Vapor Phase | Vapor Phase | Vapor Phase | Vapor Phase | Vapor Phase |
| Temperature | C | 450.0 | 148.4 | 450.0 | 148.4 | 450.0 | 450.0 | 25.0 | 332.7 | 450.0 | 1081.6 |
| Pressure | bar | 1.1 | 1.1 | 8.1 | 1.1 | 8.1 | 6.7 | 1.0 | 6.7 | 6.7 | 6.7 |
| | | | | | | Mole Flows | | | | | |
| H2O | mol/min | 0.0 | 0.0 | 0.0 | 0.0 | 0.0 | 0.0 | 0.0 | 0.0 | 0.0 | 132.7 |
| H2 | mol/min | 167.3 | 367.3 | 54.7 | 167.3 | 54.7 | 54.7 | 0.0 | 0.0 | 0.0 | 0.0 |
| O2 | mol/min | 0.0 | 0.0 | 0.0 | 0.0 | 0.0 | 0.0 | 256.1 | 256.1 | 256.1 | 189.8 |
| N2 | mol/mia | 0.0 | 0.0 | 74.0 | 0.0 | 74.0 | 74.0 | 970.8 | 970.8 | 970.8 | 1070.8 |
| NH3 | mol/min | 0.0 | 0.0 | 52.0 | 0.0 | 52.0 | 52.0 | 0.0 | 0.0 | 0.0 | 0.0 |
| | | | | | | Mass Flows | | | | | |
| H2O | kg/day | 0.0 | 0.0 | 0.0 | 0.0 | 0.0 | 0.0 | 0.0 | 0.0 | 0.0 | 3443.2 |
| H2 | kgidsy | 485.6 | 485.6 | 158.9 | 485.6 | 158.9 | 158.9 | 0.0 | 0.0 | 0.0 | 0.0 |
| O2 | kg/day | 0.0 | 0.8 | 0.0 | 0.0 | 0.0 | 0.0 | 11802.7 | 11802.7 | 11802.7 | 8744.8 |
| N2 | kg/day | 0.0 | 0.0 | 2985.1 | 0.0 | 2985.1 | 2985.1 | 39161.3 | 39161.3 | 39161.1 | 43195.1 |
| NH3 | kg/day | 0.0 | 0.0 | 1275.2 | 0.0 | 1275.2 | 1275.2 | 0.0 | 0.0 | 0.0 | 0.0 |

TABLE 3C

Process simulation results assuming a micro turbine efficiency of 28.5% (cont'd).

| | Units | EXH-1 | EXH-2 | AFT-RECO | EXHAUST | BOT | BOT-WAT | COOL-WAT | COOLWAT2 | HEX-WAT |
|---|---|---|---|---|---|---|---|---|---|---|
| Phase | | Vapor Phase | Vapor Phase | Vapor Phase | Vapor Phase | Liquid Phase | Liquid Phase | Liquid Phase | Liquid Phase | Liquid Phase |
| Temperature | C | 673.8 | 470.0 | 368.9 | 150.0 | 37.7 | 31.2 | 20.0 | 20.0 | 20.6 |
| Pressure | bar | 1.1 | 1.1 | 1.1 | 1.1 | 1.1 | 1.1 | 1.0 | 1.2 | 1.2 |
| | | | | | | Mole Flows | | | | |
| H2O | mol/mia | 132.7 | 132.7 | 132.7 | 132.7 | 750.0 | 750.0 | 20000.0 | 20000.0 | 20000.0 |
| H2 | mol/min | 0.0 | 0.0 | 3.0 | 0.0 | 0.0 | 0.0 | 0.0 | 0.0 | 0.0 |
| O2 | mol/min | 189.8 | 189.8 | 189.8 | 189.8 | 0.0 | 0.0 | 0.0 | 0.0 | 0.0 |
| N2 | mol/min | 1070.8 | 1070.8 | 1070.8 | 1070.8 | 0.0 | 0.0 | 0.0 | 0.0 | 0.0 |
| NH3 | mol/min | 0.0 | 0.0 | 0.0 | 0.0 | 50.0 | 50.0 | 0.0 | 0.0 | 0.0 |

TABLE 3C-continued

Process simulation results assuming a micro turbine efficiency of 28.5% (cont'd).

| | Units | EXH-1 | EXH-2 | AFT-RECO | EXHAUST | BOT | BOT-WAT | COOL-WAT | COOLWAT2 | HEX-WAT |
|---|---|---|---|---|---|---|---|---|---|---|
| | | | | | Mass Flows | | | | | |
| H2O | kg/day | 3443.2 | 3443.2 | 3443.2 | 3443.2 | 19456.5 | 19456.5 | 518840.1 | 518840.1 | 518840.1 |
| H2 | kg/day | 0.0 | 0.0 | 0.0 | 0.0 | 0.0 | 0.0 | 0.0 | 0.0 | 0.0 |
| O2 | kg/day | 8744.8 | 8744.8 | 8744.8 | 8744.8 | 0.0 | 0.0 | 0.0 | 0.0 | 0.0 |
| N2 | kg/day | 43195.1 | 43195.1 | 43195.1 | 43195.1 | 0.0 | 0.0 | 0.0 | 0.0 | 0.0 |
| NH3 | kg/day | 0.0 | 0.0 | 0.0 | 0.0 | 1226.2 | 1226.2 | 0.0 | 0.0 | 0.0 |

TABLE 5A

Process simulation results assuming a micro turbine efficiency of 23.5%.

| | Units | NH3 + H2O | NH3H2O-2 | VAPO-NH3 | HEX-NH3 | COMP-NH3 | NH3-2 | PRESNH3 | MEM-REFOR.-NH3 | MEM-REFOR.-HEX-NH3 | MEM-REFOR.-CONV NH3 |
|---|---|---|---|---|---|---|---|---|---|---|---|
| Phase | | Liquid Phase | Liquid Phase | Vapor Phase | Vapor Phase | Vapor Phase | Vapor Phase | Vapor Phase | Vapor Phase | Vapor Phase | Vapor Phase |
| Temperature | C | 25.0 | 25.1 | −31.7 | 25.0 | 133.1 | 23.0 | 122.2 | 122.2 | 300.0 | 450.0 |
| Pressure | bar | 3.0 | 4.0 | 1.1 | 1.1 | 3.1 | 3.1 | 8.1 | 8.1 | 8.1 | 8.1 |
| | | | | | | Mole Flows | | | | | |
| H2O | mol/min | 750.0 | 750.0 | 0.0 | 0.0 | 0.0 | 0.0 | 0.0 | 0.0 | 0.0 | 0.0 |
| H2 | mol/min | 0.0 | 0.0 | 0.0 | 0.0 | 0.0 | 0.0 | 0.0 | 0.0 | 0.0 | 222.0 |
| O2 | mol/min | 0.0 | 0.0 | 0.0 | 0.0 | 0.0 | 0.0 | 0.0 | 0.0 | 0.0 | 0.0 |
| N2 | mol/min | 0.0 | 0.0 | 0.0 | 0.0 | 0.0 | 0.0 | 0.0 | 0.0 | 0.0 | 74.0 |
| NH3 | mol/min | 250.0 | 250.0 | 200.0 | 200.0 | 200.0 | 200.0 | 200.0 | 200.0 | 200.0 | 52.0 |
| | | | | | | Mass Flows | | | | | |
| H2O | kg/day | 19456.5 | 19456.5 | 0.0 | 0.0 | 0.0 | 0.0 | 0.0 | 0.0 | 0.0 | 0.0 |
| H2 | kg/day | 0.0 | 0.0 | 0.0 | 0.0 | 0.0 | 0.0 | 0.0 | 0.0 | 0.0 | 644.4 |
| O2 | kg/day | 0.0 | 0.0 | 0.0 | 0.0 | 0.0 | 0.0 | 0.0 | 0.0 | 0.0 | 0.0 |
| N2 | kg/day | 0.0 | 0.0 | 0.0 | 0.0 | 0.0 | 0.0 | 0.0 | 0.0 | 0.0 | 2985.1 |
| NH3 | kg/day | 6131.0 | 6131.0 | 4904.8 | 4904.8 | 4904.8 | 4904.8 | 4904.8 | 4904.8 | 4904.8 | 1275.2 |

TABLE 5B

Process simulation results assuming a micro turbine efficiency of 23.5% (cont'd).

| | Units | MEM-REFOR.-PERM | MEM-REFOR.-PERM 2 | MEM-REFOR.-H2-PERM | MEM-REFOR.-RETEN | H2-PERM | RETEN | RETEN-2 | CUMBAIR | PRES-AIR | HEX-AIR |
|---|---|---|---|---|---|---|---|---|---|---|---|
| Phase | | Vapor Phase | Vapor Phase | Vapor Phase | Vapor Phase | Vapor Phase | Vapor Phase | Vapor Phase | Vapor Phase | Vapor Phase | Vapor Phase |
| Temperature | C | 450.0 | 450.0 | 148.4 | 450.0 | 148.4 | 450.0 | 450.0 | 25.0 | 372.4 | 450.0 |
| Pressure | bar | 8.1 | 1.1 | 1.1 | 8.1 | 1.3 | 8.1 | 6.7 | 3.0 | 6.7 | 6.7 |
| | | | | | | Mole Flows | | | | | |
| H2O | mol/min | 0.0 | 0.0 | 0.0 | 0.0 | 0.0 | 0.0 | 0.0 | 0.0 | 0.0 | 0.0 |
| H2 | mol/min | 167.3 | 167.3 | 167.3 | 54.7 | 167.3 | 54.7 | 54.7 | 0.0 | 0.0 | 0.0 |
| O2 | mol/min | 0.0 | 0.0 | 0.0 | 0.0 | 0.0 | 0.0 | 0.0 | 256.1 | 256.1 | 256.1 |
| N2 | mol/min | 0.0 | 0.0 | 0.0 | 74.0 | 0.0 | 74.0 | 74.0 | 970.8 | 970.8 | 970.8 |
| NH3 | mol/min | 0.0 | 0.0 | 0.0 | 52.0 | 0.0 | 52.0 | 52.0 | 0.0 | 0.0 | 0.0 |
| | | | | | | Mass Flows | | | | | |
| H2O | kg/day | 0.0 | 0.0 | 0.0 | 0.0 | 0.0 | 0.0 | 0.0 | 0.0 | 0.0 | 0.0 |
| H2 | kg/day | 485.6 | 485.6 | 485.6 | 158.9 | 485.6 | 158.9 | 158.9 | 0.0 | 0.0 | 0.01 |
| O2 | kg/day | 0.0 | 0.0 | 0.0 | 0.0 | 0.0 | 0.0 | 0.0 | 11802.7 | 11802.7 | 11802.7 |
| N2 | kg/day | 0.0 | 0.0 | 0.0 | 2985.1 | 0.0 | 2985.1 | 2985.3 | 39161.1 | 39161.1 | 39161.1 |
| NH3 | kg/day | 0.0 | 0.0 | 0.0 | 1275.2 | 0.0 | 1275.2 | 1275.2 | 0.0 | 0.0 | 0.0 |

TABLE 5C

Process simulation results assuming a micro turbine efficiency of 23.5% (cont'd).

| | Units | EXH2 | EXH-1 | EXH-2 | AFT. RECO | EXHAUST | BOT | BOT-WAT | COOL-WAT | COOLWA T2 | HEX-WAT |
|---|---|---|---|---|---|---|---|---|---|---|---|
| Phase | | Vapor Phase | Vapor Phase | Vapor Phase | Vapor Phase | Vapor Phase | Liquid Phase | Liquid Phase | Liquid Phase | Liquid Phase | Liquid Phase |
| Temperature | C | 1081.6 | 673.6 | 470.0 | 408.1 | 150.0 | 37.7 | 31.2 | 20.0 | 20.0 | 20.6 |
| Pressure | bar | 6.7 | 1.1 | 1.1 | 1.1 | 1.1 | 1.1 | 1.1 | 1.0 | 1.2 | 1.2 |
| Mole Flows | | | | | | | | | | | |
| H2O | mol/min | 132.7 | 132.7 | 132.7 | 132.7 | 132.7 | 750.0 | 750.0 | 20000.0 | 20000.0 | 20000.0 |
| H2 | mol/min | 0.0 | 0.0 | 0.0 | 0.0 | 0.0 | 0.0 | 0.0 | 0.0 | 0.0 | 0.0 |
| O2 | mol/min | 189.8 | 189.8 | 189.8 | 189.8 | 189.8 | 0.0 | 0.0 | 1.0 | 0.0 | 0.0 |
| N2 | mol/min | 1070.8 | 1070.8 | 1070.8 | 1.070.8 | 1070.8 | 0.0 | 0.0 | 0.0 | 0.0 | 0.0 |
| NH3 | mol/min | 0.0 | 3.0 | 0.0 | 0.0 | 0.0 | 50.0 | 50.0 | 0.0 | 0.0 | 0.0 |
| Mass Flows | | | | | | | | | | | |
| H2O | kg/day | 3443.2 | 3443.2 | 3443.2. | 3443.2 | 3443.2 | 19456.5 | 19456.5 | 518840.1 | 518840.1 | 518840.1 |
| H2 | kg/day | 0.0 | 0.0 | 0.0 | 0.0 | 0.0 | 0.0 | 0.0 | 0.0 | 0.0 | 0.0 |
| O2 | kg/day | 8744.8 | 8744.8 | 8744.8 | 8744.8 | 8744.8 | 0.0 | 0.0 | 0.0 | 0.0 | 0.0 |
| N2 | kg/day | 43195.3 | 43195.1 | 43195.1 | 43195.1 | 43195.1 | 0.0 | 0.0 | 0.0 | 0.0 | 0.0 |
| NH3 | kg/day | 0.0 | 0.0 | 0.0 | 0.0 | 0.0 | 1226.2 | 1226.2 | 0.0 | 0.0 | 0.0 |

What is claimed is:

1. A method for producing hydrogen and electrical power from an aqueous ammonia solution, comprising:
   distilling the aqueous ammonia solution to produce ammonia gas and a waste stream;
   compressing the ammonia gas;
   converting the ammonia gas to nitrogen and the hydrogen;
   separating the hydrogen in a membrane separator as a permeate; and
   combusting a retentate in a micro turbine to generate the electrical power.

2. The method of claim 1, comprising catalytically converting the ammonia gas to nitrogen and the hydrogen.

3. The method of claim 1, comprising electrochemically converting the ammonia gas to nitrogen and the hydrogen.

4. The method of claim 1, comprising raising the ammonia gas to an operating temperature for the membrane separator after compressing the ammonia gas.

5. The method of claim 1, comprising providing heat from an exhaust of the micro turbine to a heat exchanger to heat the ammonia gas.

6. The method of claim 1, comprising providing heat from an exhaust of the micro turbine to a boiler for distilling the aqueous ammonia solution.

7. The method of claim 1, comprising providing the electrical power to operating units producing hydrogen and electrical power from the aqueous ammonia solution.

8. The method of claim 1, comprising purifying the hydrogen to meet a fuel cell specification.

9. The method of claim 1, comprising compressing the hydrogen for a refueling operation for a fuel cell electrical vehicle (FCEV).

10. The method of claim 1, comprising providing the electrical power to a charging station for an electrical vehicle (EV).

* * * * *